United States Patent Office 2,964,535
Patented Dec. 13, 1960

2,964,535

PURIFICATION OF N-METHYL PYRROLIDONE

Howard E. Clements, La Marque, Tex., assignor to Monsanto Chemical Company, St. Louis, Mo., a corporation of Delaware No Drawing. Filed July 22, 1957, Ser. No. 673,177

6 Claims. (Cl. 260—326.5)

The present invention relates to a process for the purification of N-methyl pyrrolidone.

It is well known that N-methyl pyrrolidone may be prepared by the reaction of butyrolactone with methylamine in the presence of dehydration catalysts. The principal impurity in the final commercial product so prepared is butyrolactone. The presence of small amounts of butyrolactone in N-methyl pyrrolidone restricts its utility in some instances. In the prior art, N-methyl pyrrolidone has been purified by precipitating it as the hydrochloride from ether with hydrochloric acid and thereafter recrystallizing it from absolute ethanol. However, this method is both time-consuming and costly. It has now been determined that small amounts of butyrolactone can be substantially completely removed from N-methyl pyrrolidone by a selective hydrolysis technique which is simpler from the standpoint of operation and equipment required as well as more economical than the method heretofore used.

It is, therefore, the primary object of the present invention to provide an improved process for the purification of N-methyl pyrrolidone and particularly for the removal of small quantities of butyrolactone from N-methyl pyrrolidone containing this lactone.

According to the invention, N-methyl pyrrolidone containing a minor amount of butyrolactone as an impurity is contacted with an aqueous solution of an alkali metal hydroxide and thereafter the mixture is distilled to recover N-methyl pyrrolidone substantially free of said butyrolactone.

The treatment may be effected at room temperature, i.e., about 25° C., with a contact time as short as ten minutes. Longer contact times and/or higher temperatures may be used but offer little advantage. Generally, any temperature within the range from 0° to 120° C. may be used depending upon the rate and efficiency desired. At temperatures below 25° C., longer contact times are required.

Any of the alkali metal hydroxides such as sodium hydroxide, potassium hydroxide, lithium hydroxide, and the like may be used. The stoichiometric amount of the aqueous caustic solution required for hydrolysis of the butyrolactone present may be employed but it is preferred to use an excess of about 50 to about 100%. To ensure optimum efficiency of removal when using aqueous solutions of the hydroxide treating agent, effective agitation during the hydrolysis is required. This is so because of the limited solubility of the alkali metal hydroxides in the N-methyl pyrrolidone phase of the N-methyl pyrrolidone-water mixture.

After hydrolysis is complete, excess caustic solution may be neutralized by addition of any suitable acid or acidic salt, for example, sodium bisulfate. After neutralization, the mixture is filtered if necessary to remove any precipitate and then distilled to recover the purified N-methyl pyrrolidone. The neutralization step is not absolutely necessary. The treated material may be directly subjected to distillation to remove the water and recover the purified N-methyl pyrrolidone with no noticeable degradation of the N-methyl pyrrolidone.

Another contemplated mode of operation within the scope of the invention involves the addition of water to the N-methyl pyrrolidone and passage of the resultant mixture through a bed of solid alkali or through a tower packed with the solid alkali. The material thus treated could then be passed directly to a fractionation column for recovery of the pure N-methyl pyrrolidone.

The invention is illustrated in the following examples which, however, are not to be considered as limiting its scope in any manner.

Example I

About 230 ml. of a sample of N-methyl pyrrolidone containing 1.91 weight percent of butyrolactone was charged to a flask equipped with an efficient stirrer. To this there was added a solution of 3 g. of sodium hydroxide in 30 ml. of water. The mixture was vigorously agitated at room temperature for about 10 minutes. At the end of this time, phenolphthalein indicator was added and the mixture was neutralized with 11.9 ml. of a solution of 20 g. of $NaHSO_4$ in 40 ml. of water. The mixture was distilled and the N-methyl pyrrolidone recovered. The purity of a sample of the recovered product as determined by freezing point was 99.77 mole percent.

Example II

To 300 ml. of the pure N-methyl pyrrolidone (99.8%) obtained in Example I, there was added 10 ml. of butyrolactone, 50 ml. of water and 10 g. of sodium hydroxide. The mixture was stirred well. The flask was attached to a conventional fractionating column and the mixture was fractionated to remove the water and recover the N-methyl pyrrolidone. The contents of the distillation flask were continuously agitated during the fractionation. A sample of the recovered N-methyl pyrrolidone was analyzed by freezing point and found to have a purity identical to that originally in the mixture—99.8 mole percent.

What is claimed is:

1. A process for the removal of butyrolactone from N-methyl pyrrolidone containing minor amounts of butyrolactone which comprises contacting said N-methyl pyrrolidone with an aqueous solution of an alkali metal hydroxide and thereafter distilling said treated mixture to recover N-methyl pyrrolidone substantially free of butyrolactone.

2. A process for the removal of butyrolactone from N-methyl pyrrolidone containing minor amounts of butyrolactone which comprises contacting said N-methyl pyrrolidone with an aqueous solution of an alkali metal hydroxide at a temperature from about 0° C. to about 120° C. and thereafter distilling said treated mixture to recover N-methyl pyrrolidone substantially free of butyrolactone.

3. A process for the removal of butyrolactone from N-methyl pyrrolidone containing minor amounts of butyrolactone which comprises contacting said N-methyl pyrrolidone with an aqueous solution of an alkali metal hydroxide in an amount representing an excess of from about 50 to about 100% over that required to hydrolyze said butyrolactone and thereafter distilling said treated mixture to recover N-methyl pyrrolidone substantially free of butyrolactone.

4. A process for the removal of butyrolactone from N-methyl pyrrolidone containing minor amounts of butyrolactone which comprises contacting said N-methyl pyrrolidone at a temperature of about 25° C. with an aqueous solution of an alkali metal hydroxide in an amount representing an excess of from about 50 to about 100% over that required to hydrolyze said butyrolactone for a period of at least 10 minutes and thereafter distilling said treated mixture to recover N-methyl pyrrolidone substantially free of butyrolactone.

5. The process of claim 4 wherein said alkali metal hydroxide is sodium hydroxide.

6. A process for the removal of butyrolactone from N-methyl pyrrolidone containing minor amounts of butyrolactone which comprises contacting said N-methyl pyrrolidone with an aqueous solution of sodium hydroxide in an amount representing an excess of from about 50% to about 100% over that required to hydrolyze said butyrolactone at a temperature of about 25° C. for a period of at least ten minutes, thereafter neutralizing said mixture, and recovering N-methyl pyrrolidone substantially free of butyrolactone therefrom by distillation.

References Cited in the file of this patent

UNITED STATES PATENTS 2,828,307  Soeterbroek et al. _____ Mar. 25, 1958

OTHER REFERENCES

Richter: Organic Chemistry, vol. 3, pp. 3 to 4 (1923), P. Blakistons Son and Co.

Marvel et al.: J. Am. Chem. Soc., vol. 51, pp. 260–2 (1929).

Young: Distillation Principles and Processes, chapt. 1, p. 3, McMillan and Co., Limited, St. Martin's Street, London.